United States Patent
Warwick et al.

[11] Patent Number: 5,983,741
[45] Date of Patent: Nov. 16, 1999

[54] REVERSE GEAR ASSEMBLY OF A TRANSMISSION

[75] Inventors: William K. Warwick, Palmyra; Mario Charles DeSantis, Syracuse; Keith L. Snyder, North Syracuse, all of N.Y.

[73] Assignee: New Venture Gear, Inc., Troy, Mich.

[21] Appl. No.: 09/179,216

[22] Filed: Oct. 27, 1998

[51] Int. Cl.[6] .................................................. F16H 57/00
[52] U.S. Cl. ................................. 74/339; 74/342; 74/462
[58] Field of Search ............................. 74/339, 342, 344, 74/462

[56] References Cited

U.S. PATENT DOCUMENTS

| | | | |
|---|---|---|---|
| 885,194 | 4/1908 | Sponable | 74/462 |
| 4,474,074 | 10/1984 | Nakao et al. | 74/462 |
| 4,641,734 | 2/1987 | Müller et al. | 192/53 F |
| 4,817,773 | 4/1989 | Knödel et al. | 192/53 F |
| 4,836,348 | 6/1989 | Knödel et al. | 192/53 F |
| 4,905,806 | 3/1990 | Hillenbrand et al. | 192/53 F |
| 5,083,993 | 1/1992 | Öun | 475/299 |
| 5,722,291 | 3/1998 | Fraley et al. | 74/325 |
| 5,785,162 | 6/1998 | Barksdale | 192/53.331 |

*Primary Examiner*—Dirk Wright
*Attorney, Agent, or Firm*—Harness, Dickey & Pierce, P.L.C.

[57] ABSTRACT

A manual transmission for use in motor vehicles is disclosed. The transmission includes an input shaft, an output shaft, and a plurality of constant-mesh gearsets that can be selectively engaged for establishing corresponding forward gears therebetween. In addition, a reverse gear assembly is provided for establishing the reverse gear. The reverse gear assembly includes an idler shaft non-rotatably mounted within a housing of the transmission and an idler gear journally supported on the idler shaft. The idler gear is linearly movable into engagement with a reverse input gear and a reverse speed gear. Each tooth of the reverse idler gear includes a pair of intersecting flank radii which intersect at the tooth centerline, creating an included angle therebetween. The teeth of the input and output gears are similarly formed to include a pair of flank radii and included angles. The reverse speed gear preferably includes a "pointing step-back" design which allows a single idler gear tooth to control final engagement.

18 Claims, 5 Drawing Sheets

REVERSE GEAR ASSEMBLY OF A TRANSMISSION

BACKGROUND OF THE INVENTION

The present invention generally pertains to multi-speed transmissions for motor vehicles. More particular, the present invention pertains to a reverse gear assembly for motor vehicle multi-speed transmissions. More specifically, but without restriction to the particular embodiment and/or use which is shown and described for purposes of illustration, the present invention is directed to a reverse gear assembly for a manual transmission having a sliding reverse idler. The reverse gear arrangement is provided with enhanced tooth pointing for reducing shift effort.

As is well known, shifting gears in manual transmissions is caused by selectively coupling one of the gearsets for driving the output shaft at a predetermined speed ratio relative to the input shaft. Most manual transmissions include a plurality of synchro-mesh gearsets for establishing the forward gears. Sliding-type gearsets have traditionally been used for establishing the reverse gear. Modernly, manual transmissions are often equipped with synchronized reverse gear arrangements for preventing the undesirable grinding noise often associated with conventional sliding-type arrangements. An exemplary synchronized reverse gear arrangement is disclosed in commonly assigned U.S. Pat. No. 5,722,291, which is incorporated by reference as if fully set forth herein.

While known reverse gear arrangements generally perform their intended function, all are associated with disadvantages. For example, as a reverse gear assembly translates a reverse idler to ultimately achieve idler gear tooth meshing with input and output shafts, the idler must first index into the proper orientation to allow its gear teeth to pass into both the input and output gear tooth space widths. Known arrangements incorporating a pointed spur tooth sliding idler reverse system often encounter centerline crossing of idler to output sleeve tooth pointing. Such centerline crossing leads to blockout and increased shift effort. Additionally, synchronized reverse gear arrangements are associated with increase costs.

SUMMARY OF THE INVENTION

Accordingly, the present invention is directed to a sliding reverse gear idler assembly for use in multi-speed manual transmissions. The idler assembly incorporates enhanced tooth pointing in accordance with the present invention which eliminates centerline crossing of idler to output sleeve tooth pointing which leads to blockout in conventional arrangement. By eliminating the blocking or crossing conditions, the shift effort or operator shift lever feedback while shifting into reverse is reduced to a minimum without the need for a complex synchronizer arrangement. By bringing the reverse gear shift effort into close proximity of a forward gear, a reduced shift effort is provided.

In one form, the present invention provides a transmission including a housing and first and second shafts rotatably supported in the housing. The first shaft carries a first gear. The second shaft carries a second gear. The second gear includes a plurality of teeth each having a pair of intersecting flank radii. The transmission further includes a third shaft supported in the housing. A third gear is journally supported on the third shaft for linear movement between a first position and a second position for selectively coupling the first gear and the second gear. The third gear includes a plurality of teeth each having a pair of intersecting flank radii.

In a more preferred form, the present invention provides a transmission including a housing, an input shaft rotatably supported in the housing, and an output shaft rotatably mounted in the housing. The input shaft carries a reverse input gear. The transmission additionally includes a first forward gearset including a first forward input gear fixed to the input shaft and meshed with a first forward speed gear rotatably supported on the output shaft. A synchronizer clutch is driven by the output shaft for selectively coupling the first forward speed gear thereto to establish a first forward gear. The synchronizer clutch includes a hub and a shift sleeve supported for common rotation with and axial translation on the hub. A reverse speed gear is carried by the shift sleeve. An idler shaft is supported in the housing. An idler gear is journally supported on the idler shaft. The idler gear is linearly movable between a first position and a second position for selectively coupling the reverse speed gear and the reverse input gear to establish a reverse gear.

BRIEF DESCRIPTION OF THE DRAWINGS

Further objects, features and advantages of the present invention will become apparent to those skilled in the transmission art from studying the following description and the accompanying drawings in which.

DETAILED DESCRIPTION OF THE INVENTION

Figure 1:
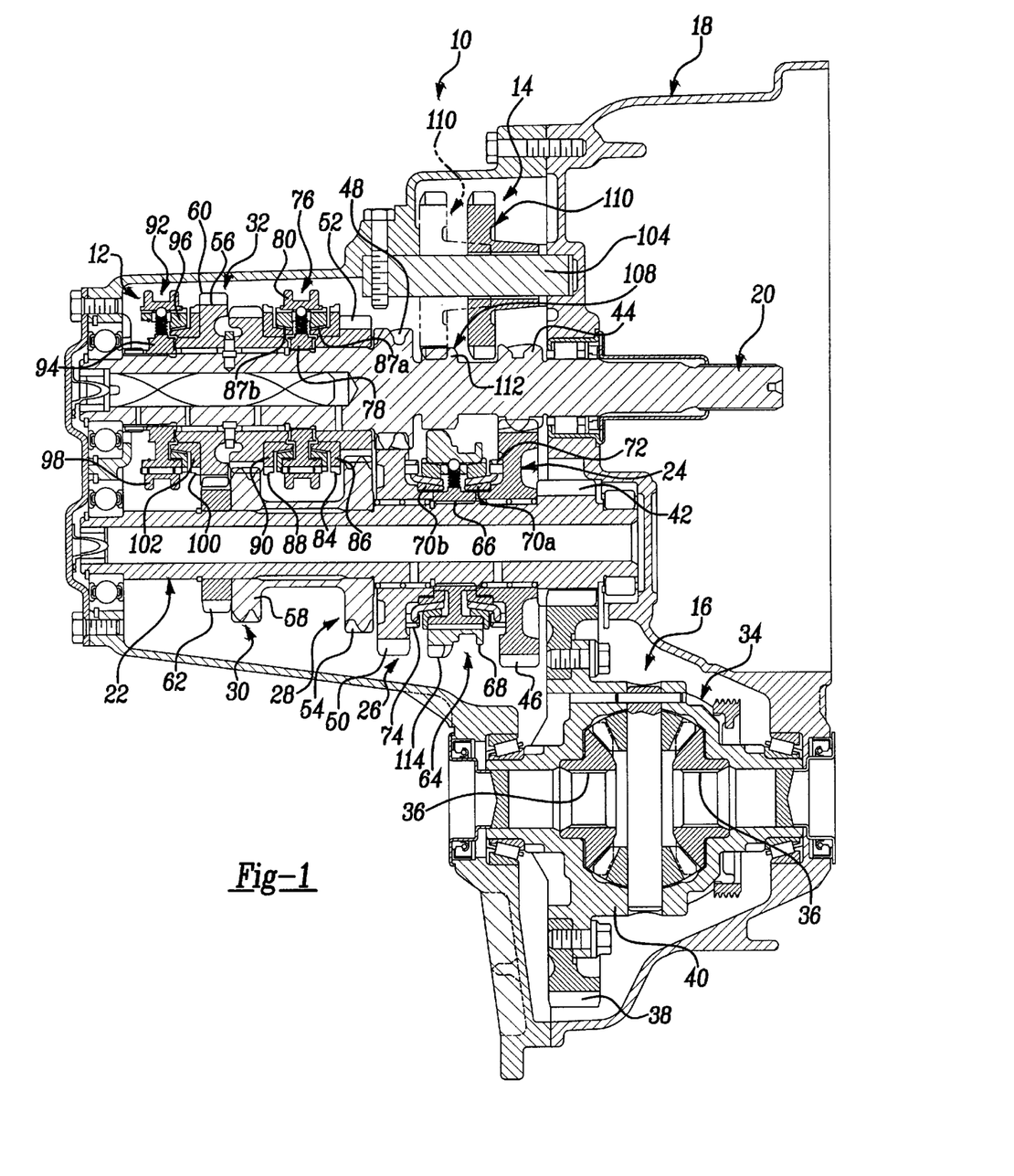
FIG. 1 is a cross-sectional view of a multi-speed transmission equipped with a reverse gear assembly constructed in accordance with the teachings of a preferred embodiment of the present invention.

Referring to FIG. 1, a multi-speed transmission 10 of the transaxle variety is shown that is particularly adapted for use in front wheel drive motor vehicles. In general, the transmission 10 includes a multi-speed geartrain 12, a reverse gear assembly 14, and a power transfer mechanism 16, all of which are operably mounted within a transmission housing 18. The geartrain 12 includes an input shaft 20 that is adapted to be rotatably driven by the output shaft (not shown) of the motor vehicle's engine and which is connectable thereto through engagement of a manually-operable clutch (not shown). The geartrain 12 also includes an output shaft 22 and a series of constant-mesh gearsets 24, 26, 28, 30 and 32. Each gearset 24–32 can be selectively engaged for coupling output shaft 22 to input shaft 20 for establishing five different forward speed ratios (i.e., five forward gears). Likewise, the reverse gear assembly 14 can be selectively engaged for coupling the output shaft 22 to the input shaft 20 for establishing a reverse speed ratio (i.e., reverse gear).

The power transfer mechanism 16 is rotatably driven by the output shaft 22 and includes a differential assembly 34 that is operable for delivering drive torque through a pair of side gears 36 to a pair of front wheel drive shafts (not shown). A drive gear 38 is shown fixed to the housing 40 of the differential assembly 34 and is in constant meshed engagement with an output gear 42 formed on the output shaft 22. As is known, driven rotation of the housing 40 results in the side gears 36 being rotatively driven while permitting speed differentiation therebetween. As seen, the input shaft 20, the output shaft 22, the reverse gear assembly 14 and the differential assembly 34 are all rotatably supported within the housing 18 by suitable bearings.

With continued reference to FIG. 1, the first gearset 24 is shown to include a first input gear 44 formed with the input shaft 20 and a first speed gear 46 rotatably supported on the output shaft 22. The first input gear 44 is in constant mesh with the first speed gear 46 for defining a first power transmission path from input shaft 20 to output shaft 22 so as to establish the first speed ratio therebetween or first forward gear. The second gearset 26 includes a second input gear 48 formed with input shaft 20 and a second speed gear 50 rotatably supported on the output shaft 22. The second input gear 48 is in constant mesh with the second speed gear 50 for defining a second power transmission path from the input shaft 20 to the output shaft 22 and establishing the second speed ratio therebetween. The third gearset 28 includes a third input gear 52 rotatably supported on the input shaft 20 that is in constant mesh with a third output gear 54 fixed to the output shaft 22 for defining a third power transmission path from the input shaft 20 to the output shaft 22 and establishing the third speed ratio therebetween. A fourth gearset 30 includes a fourth input gear 56 rotatably supported on the input shaft 20 and which is in constant mesh with a fourth output gear 58 fixed to the output shaft 22 thereby establishing a fourth power transmission path at the fourth speed ratio therebetween. Finally, the fifth gearset 32 includes a fifth input gear 60 rotatably supported on the input shaft 20 and which is in constant mesh with a fifth output gear 62 fixed to the output shaft 22 thereby establishing a fifth power transmission path and the fifth speed ratio therebetween.

As noted, the geartrain 12 is arranged to selectively deliver drive torque from the input shaft 20 to the output shaft 22 through one of the five different power transmission paths for establishing five different forward gears. To this end, each gearset of the geartrain 12 is associated with a selectively engageable synchronizing clutch. More particularly, a first synchronizer clutch 64 is operably installed between the first gearset 24 and the second gearset 26 and includes a first hub 66 fixed to output shaft 22, a first shift sleeve 68, and a pair of dual cone-type synchronizers 70a and 70b. The first synchronizer clutch 64 is of the doubleacting variety such that the first shift sleeve 68 is supported for common rotation with and bi-directional axial movement on the first hub 66 for selectively coupling one of the first and second gearsets 24 and 26, respectively, to the output shaft 22 for establishing either of the first or second forward gears. In particular, forward axial movement of the first shift sleeve 68 from its neutral position shown energizes the synchronizer 70a which, in turn, causes speed synchronization between the first gearset 24 and the output shaft 22. Upon completion of the speed synchronization, the first shift sleeve 68 moves into engagement with clutch teeth 72 on the first speed gear 46 for engaging the first power transmission path and establishing the first forward gear. In a like manner, rearward axial movement of the first shift sleeve 68 energizes synchronizer 70b and causes speed synchronization between the second gearset 26 and the output shaft 22. Thereafter, the first shift sleeve 68 moves into engagement with clutch teeth 74 on the second speed gear 50 for engaging the second power transmission path and establishing the second forward gear.

A second synchronizer clutch 76 is operably installed between the third and the fourth gearsets 28 and 30 and includes a second hub 78 fixed to the input shaft 20, a second shift sleeve 80, and a pair of cone-type synchronizers 82a and 82b. The second synchronizer clutch 76 is also a double-acting arrangement with the second shift sleeve 80 supported on the second hub 78 for common rotation therewith and bi-directional axial movement thereon for selectively coupling one of the third and the fourth gearsets 28 and 30, respectively, to the input shaft 20 for establishing either of the third or fourth forward gears. Specifically, forward axial movement of the second shift sleeve 80 from its neutral position shown causes speed synchronization between the third gearset 28 and the input shaft 20 and results in engagement of the second shift sleeve 80 with clutch teeth 84 on a clutch ring 86 that is fixed to the third input gear 52, thereby engaging the third power transmission path and establishing third forward gear. Rearward axial movement of the second shift sleeve 80 causes speed synchronization between the fourth gearset 30 and the input shaft 20 and results in engagement of the second shift sleeve 80 with clutch teeth 88 on a clutch ring 90 fixed to fourth input gear 56, thereby engaging the fourth power transmission path and establishing the fourth forward gear.

A third synchronizer clutch 92, of the dual-acting type, is operably installed adjacent to the fifth gearset 32 and includes a third hub 94 fixed to the input shaft 20, a synchronizer 96, and a third shift sleeve 98 that is supported for rotation with and axial movement on the third hub 94 for selectively coupling the fifth gearset 32 to the input shaft 20 to establish the fifth forward gear. In particular, forward axial movement of the third shift sleeve 98 from the neutral position shown causes speed synchronization between the fifth gearset 32 and the input shaft 20 and results in engagement of the third shift sleeve 98 with clutch teeth 100 on a clutch ring 102 fixed to the fifth input gear 60, thereby engaging the fifth power transmission path and establishing the fifth forward gear. As seen in FIG. 1, each of the shift sleeves 68, 80 and 98 is shown positioned in a central or non-engaged position for establishing a neutral mode in which drive torque is not transferred from the input shaft 20 to the output shaft to 22 through any of the gearsets. As will be appreciated, the synchronizers can be of any conventional construction currently known in the manual transmission art, with such alternative arrangements considered equivalent thereto.

Figure 2:
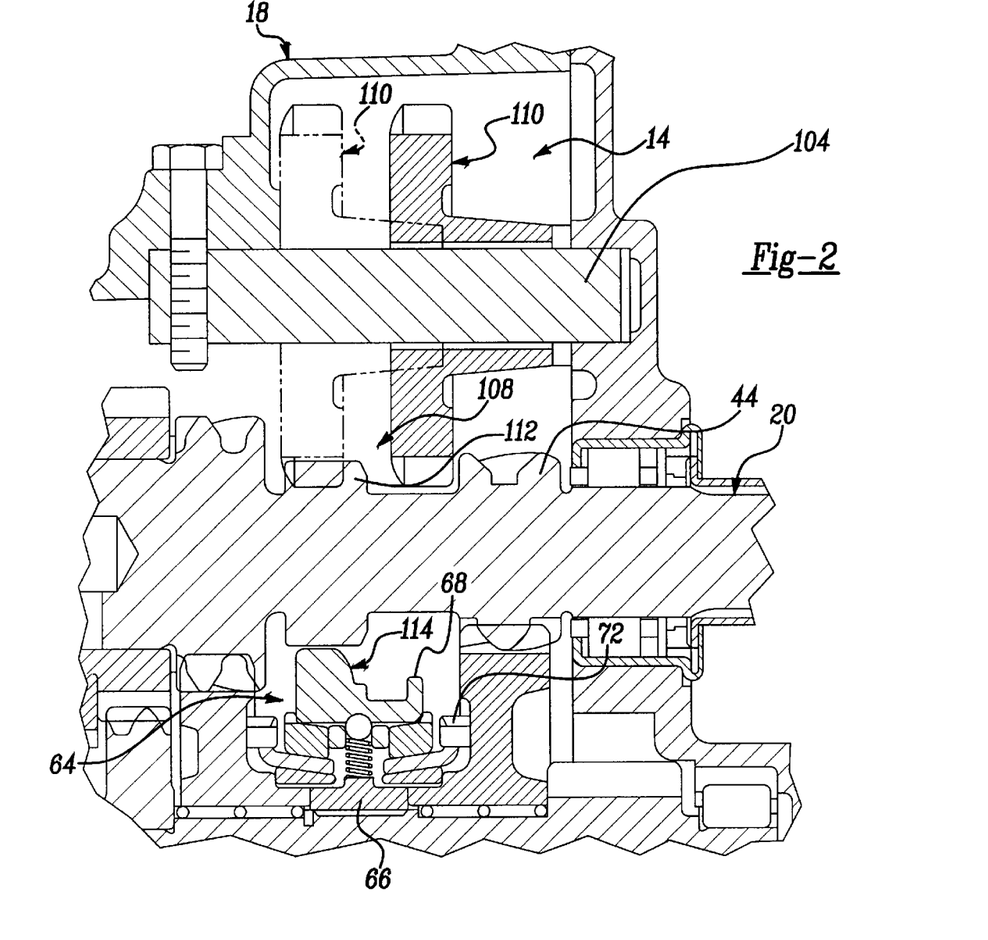
FIG. 2 is an enlarged partial view of FIG. 1 showing the components of the reverse gear assembly in greater detail.
Figure 3:
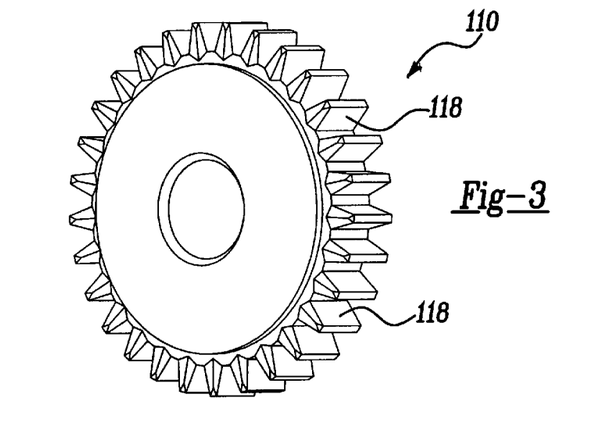
FIG. 3 is an enlarged perspective view of the reverse idler gear of FIG. 1.
Figure 4:
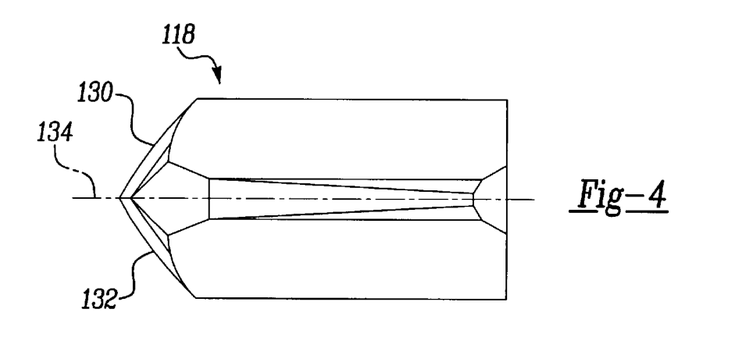
FIG. 4 is an enlarged view taken in the direction of arrow 4 of FIG. 2 illustrating in further detail one of the teeth of the reverse idler gear.

To provide means for establishing the reverse gear, the reverse gear assembly 14 is shown in FIGS. 1 and 2 to include an idler shaft 104 fixedly supported from housing 18 and a reverse gearset 108. The reverse gearset 108 includes an idler gear 110 journally supported on idler shaft 104. The idler gear 110 is linearly translatable between a first position or disengaged position (shown in solid lines in FIGS. 1 and 2) and a second position or engaged position (shown in phantom lines in FIGS. 1 and 2). It will be understood by those skilled in the art that linearly shiftable reverse idler gears are well known in the art, and in this regard, that the reverse idler 110 is movable between the first and second positions in a conventional manner. In the engaged position, the idler gear 110 is meshed with a reverse input gear 112 formed with the input shaft 20. The idler gear 110 is also meshed with a reverse speed gear 114 carried by the first shift sleeve 68 when shift sleeve 68 is in a neutral position, as shown in FIGS. 1 and 2. Thus, when idler gear 110 is translated to its engaged position, the input gear 112 of the input shaft 20 drives the idler gear 110 which in turn drives the reverse speed gear 114 and the output shaft 22 through the hub 66 in a reverse direction.

With continued reference to FIGS. 1 and 2, and additional reference to FIGS. 2–12, the idler gear 110 is shown to include a plurality of gear teeth 118 which mesh with a plurality of gear teeth 120 provided on the input gear 112 and a plurality of gear teeth 122 provided on the reverse speed gear 114. As the reverse shift conventionally translates the reverse idler 110 to ultimately achieve idler gear tooth 118 meshing with input and output gear teeth 120 and 122, the idler 110 must first index into a proper orientation so as to allow its gear teeth 118 to pass into space widths between both the input and output gear teeth 120 and 122. This indexing is facilitated by enhanced tooth pointing of the present invention which will be described below.

Figure 5:
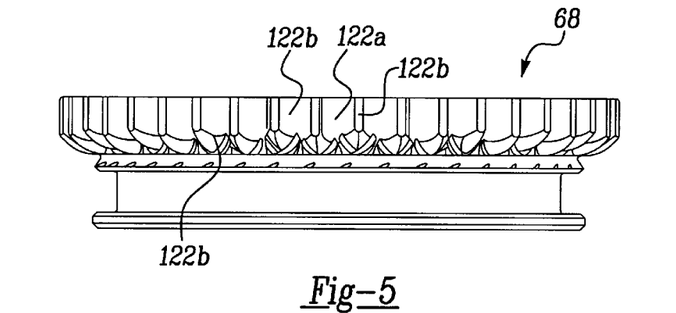
FIG. 5 is a side view of a first shift sleeve incorporating a rear speed gear of FIG. 1.
Figure 6:
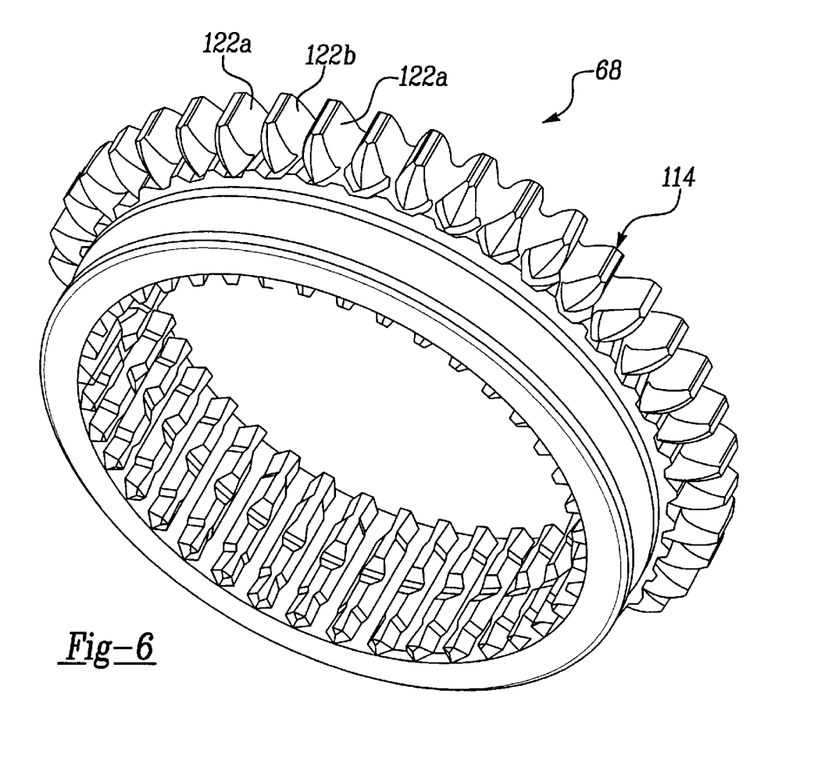
FIG. 6 is an perspective view of the first shift sleeve of FIG. 5.

With particular reference to FIG. 5, an enlarged view of one of the teeth 118 of the reverse idler 110 is illustrated. In the exemplary embodiment illustrated, the reverse idler 110 includes twenty-nine (29) teeth 118. However, it will be appreciated by those skilled in the art that more or less teeth 118 may be employed for particular applications. It will further be understood that the teeth 118 of the reverse idler 110 are substantially identical.

Each tooth 118 of the reverse idler gear 110 includes a pair of intersecting flank radii 130 and 132. The flank radii 130 and 132 intersect at the tooth centerline 134. In the exemplary embodiment, the radius of curvature for each of the flank radii 130 and 132 is approximately 11.7 mm–12.3 mm. Further, in the exemplary embodiment, the flank radii 130 and 132 define an included angle of appropriately 110°. The flank radii 130 and 132 and the defined included angle are formed with conventional spur tooth manufacturing techniques.

Figure 10:
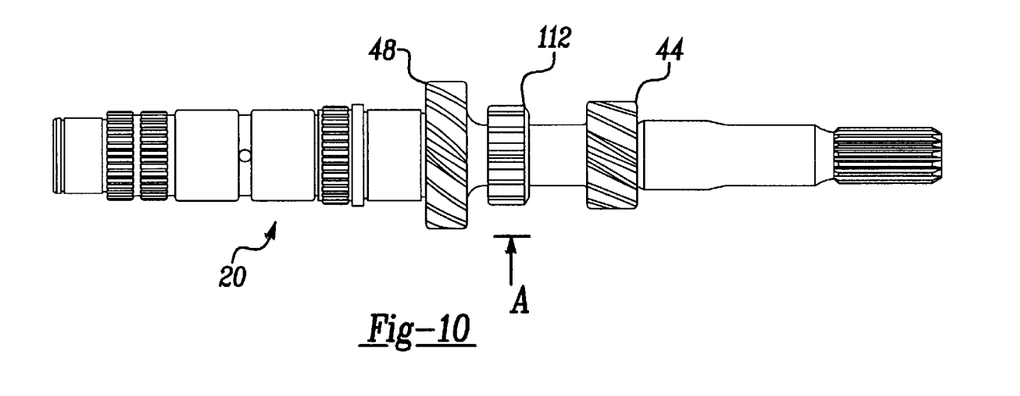
FIG. 10 is an enlarged view of the input shaft of FIGS. 1 and 2.
Figure 11:
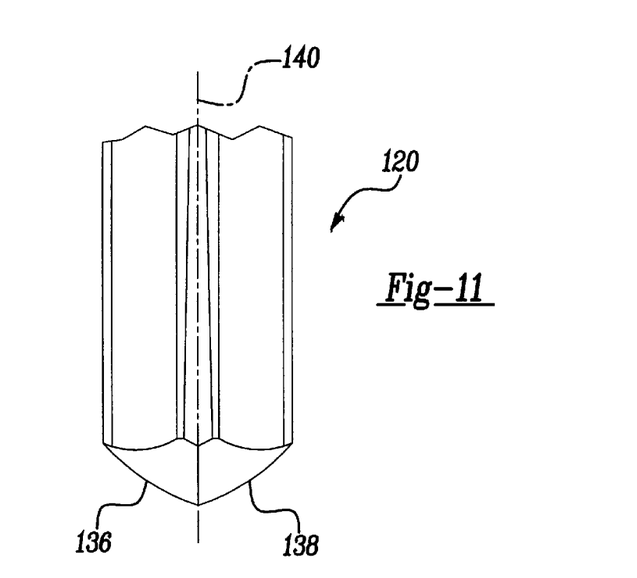
FIG. 11 is an enlarged view of one of the teeth of the reverse input gear taken in the direction of arrow A in FIG. 10.

Turning now particularly to FIGS. 10 and 11, the tooth pointing for the teeth 120 of the reverse input gear 112 will now be described. The teeth 120 of the reverse input gear 112 are twelve (12) in number and are substantially identical to one another in construction. Each tooth 120 of the reverse input gear 112 includes a pair of flank radii 136 and 138 which intersect at a tooth centerline 140. The included angle defined by the pair of flank radii 136 and 138 is substantially identical to the included angle defined by the flank radii 130 and 132 of the idler gear teeth 118. In the exemplary embodiment, the included angle defined by the flank radii 136 and 138 of the input gear teeth 120 is approximately 114°.

Turning now particularly to FIGS. 5–9, the tooth pointing of the reverse speed gear 114 will be described. As illustrated, the reverse speed gear 114 is shown integrally formed with the shift sleeve 68. In the exemplary embodiment, the teeth 122 of the reverse speed gear 114 are forty-one (41) in number. It will be understood that each tooth 122 of the reverse speed gear 114 includes substantially identical tooth pointing.

Figures 7, 8, 9:
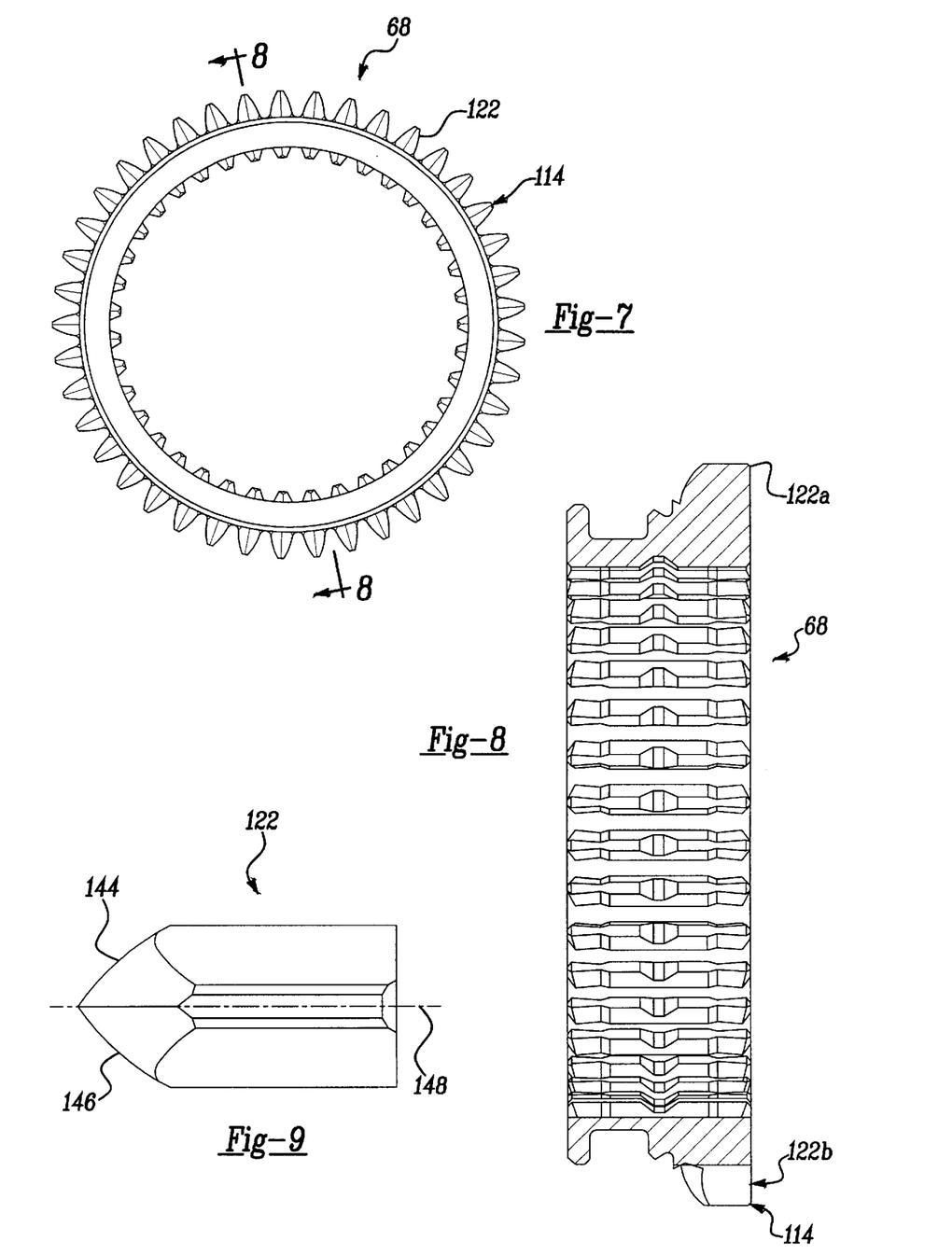
FIG. 7 is an end view of the shift sleeve of FIG. 5.
FIG. 8 is a cross-sectional view taken along the line 8—8 of FIG. 7.
FIG. 9 is an enlarged side view of one of the teeth of the rear output gear shift sleeve.

As particularly shown in the enlarged view of FIG. 9, each tooth 122 of the reverse speed gear 114 includes a pair of flank radii 144 and 146 which intersect at a tooth centerline 148. The radius of curvature for the flank radii 144 and 146 is a result of the tooling used to create the given "centerline radius" and the included angle. Preferably, the included angle defined by the flank radii 144 and 146 is less than the included angle of the idler gear 110. In the exemplary embodiment illustrated, the included angle of the output gear teeth 122 is approximately 90°.

The reverse speed gear 114 is illustrated to preferably include a "pointing step-back" design which allows a single idler tooth 118 to control final engagement. As illustrated particularly in FIGS. 5 and 6, the teeth 122 of the reverse speed gear 114 alternate between teeth 122a having a first length and teeth 122a having a second, shorter length. In this regard, the tooth pointing for the teeth 122b having the shorter length is stepped-back from the tooth pointing of the adjacent teeth 122a having the longer length. In the exemplary embodiment illustrated, the longer teeth 122a have a length of approximately 10 mm and the shorter teeth 122b have a length of approximately 9 mm. The length differential provides a "step-back" for every other tooth of approximately 1 mm. As the reverse speed gear 114 of the exemplary embodiment includes an odd number of teeth 122, it will be understood that one pair of adjacent teeth 122 share a common length.

As the transmission 10 of the present invention is shifted into reverse gear by translating idler gear 110 into toward reverse input gear 112 and reverse speed gear 114 (i.e., the broken line representation of FIG. 2), the available tooth point centerline radius available to cross the same feature on the destination tooth is reduced. On the teeth 120 of the reverse input gear 112, a sharper (i.e. smaller) centerline radius mimics the chamfering technique of the teeth 118 of the idler gear 110 for the same reason. The slightly increased included angle of the input gear 112 functions to slow the axial displacement of the idler gear 110 in anticipation of the indexing with the reverse speed gear 114. The "pointing step-back" design on reverse speed gear 114 of the sleeve 68 allows a single idler tooth 118 to control final engagement. Due to placement of the sleeve teeth 122 on its diameter, idler gear 110 has the ability to contact two sleeve teeth 122 as it is indexing and translating into mesh. The alternating tooth length of the teeth 122 on reverse speed gear 114 eliminates lead, to secondary, and back to lead tooth alternating. This allows for a smooth transition with single idler gear tooth 118 control into the sleeve mesh, thus completing the reverse gear shift with minimal shift effort and greatly reducing reverse blocking tendencies (e.g. centerline crossing).

The foregoing discussion discloses and describes a preferred embodiment of the present invention. It is contemplated that the reverse gear assemblies disclosed herein could easily be adapted for use with other multi-speed geartrains arranged for either front-wheel drive or rear-wheel drive vehicular applications. As such, those skilled in the art will readily recognize from such discussion, and from the accompanying drawings and claims, that various changes, modifications and variations can be made therein without departing from the true spirit and fair scope of the invention as defined in the following claims.

We claim:

1. A transmission comprising:

a housing;

a first shaft rotatably supported in said housing, said first shaft carrying a first gear;

a second shaft rotatably supported in said housing, said second shaft carrying a second gear, said second gear including a plurality of teeth each having a pair of intersecting flank radii;

a third shaft supported in said housing; and a third gear journally supported on said third shaft for linear movement between a first position and a second position for selectively coupling said first gear and said second gear, said third gear including a plurality of teeth each having a pair of intersecting flank radii;

whereby said intersecting flank radii of said first gear and said intersecting flank radii of said third gear reduce centerline blockout between said first and third gears and thereby reduce shift effort.

2. The transmission of claim 1, wherein said pair of flank radii of each tooth of said second gear defines a second included angle and said pair of flank radii of each tooth of said third gear defines a third included angle, said second included angle being less than said third included angle.

3. The transmission of claim 2, wherein said first gear has a plurality of teeth each having a pair of intersecting flank radii.

4. The transmission of claim 3, wherein said pair of flank radii of each tooth of said first gear defines a first included angle, said first included angle being greater than said second included angle.

5. The transmission of claim 4, wherein said third included angle is substantially equal to said first included angle.

6. The transmission of claim 2, wherein adjacent teeth of said plurality of teeth of said second gear alternate between a first length and a second length such that every other tooth of said plurality of teeth of said second gear includes a tooth point axially stepped back from a tooth point on an adjacent tooth thereof.

7. A transmission comprising:

a housing;

an input shaft rotatably supported in said housing, said input shaft carrying a reverse input gear, said reverse speed gear including a plurality of teeth each having a pair of intersecting flank radii;

an output shaft rotatably supported in said housing, said output shaft carrying a reverse output gear;

an idler shaft adapted to be supported in the housing; and an idler gear journally supported on said idler shaft for linear movement between a first position and a second position for selectively coupling said reverse input gear and said idler gear, said idler gear including a plurality of teeth each having a pair of intersecting flank radii;

whereby said intersecting flank radii of said reverse input gear and said intersecting flank radii of said idler gear reduce centerline blockout between said reverse input gear and said idler gear and thereby reduce shift effort.

8. The transmission of claim 7, wherein said pair of flank radii of each tooth of said reverse speed gear defines a first included angle and said pair of flank radii of each tooth of said idler gear defines a second included angle, said first included angle being less than said first included angle.

9. The transmission of claim 8, wherein said reverse input gear has a plurality of teeth each having a pair of intersecting flank radii.

10. The transmission of claim 9, wherein said pair of flank radii of each tooth of said reverse input gear defines a third included angle, said third included angle being greater than said second included angle.

11. The transmission of claim 10, wherein said third included angle is substantially equal to said first included angle.

12. The transmission of claim 7, wherein adjacent teeth of said plurality of teeth of said reverse output gear alternate between a first length and a second length such that every other tooth of said plurality of teeth of said reverse output gear includes a tooth point axially stepped back from a tooth point on an adjacent tooth thereof.

13. A transmission comprising:

a housing;

an input shaft rotatably supported in said housing, said input shaft carrying a reverse input gear;

an output shaft rotatably supported in said housing;

a first forward gearset including a first forward input gear fixed to said input shaft and meshed with a first forward speed gear rotatably supported on said output shaft;

a synchronizer clutch driven by said output shaft for selectively coupling said first forward speed gear thereto to establish a first forward gear, said synchronizer clutch including a hub and a shift sleeve supported for common rotation with and axial translation on said hub;

a reverse speed gear carried by said shift sleeve;

an idler shaft supported in said housing; and an idler gear journally supported on said idler shaft, said idler gear being linearly movable between a first position and a second position for selectively coupling said reverse speed gear and said reverse input gear to establish a reverse gear.

14. The transmission of claim 13, further comprising a second forward gearset including a second forward input gear fixed on said input shaft and meshed with a second forward speed gear rotatably supported on said output shaft, said synchronizer clutch further being operable to selectively coupling said second forward speed gear to said output shaft to establish a second forward gear.

15. The transmission of claim 13, wherein said reverse speed gear includes a plurality of teeth each having a pair of intersecting flank radii, and further wherein said idler gear includes a plurality of teeth each having a pair of intersecting flank radii, and further wherein said idler gear includes a plurality of teeth each having a pair of intersecting flank radii.

16. The transmission of claim 15, wherein said reverse input gear has a plurality of teeth each having a pair of intersecting flank radii.

17. The transmission of claim 15, wherein said pair of flank radii of each tooth of said reverse speed gear defines a first included angle and said pair of flank radii of each tooth of said idler gear defines a second included angle, said first included angle being less than said second included angle.

18. The transmission of claim 15, wherein adjacent teeth of said plurality of teeth of said reverse output gear alternate between a first length and a second length such that every other tooth of said plurality of teeth of said reverse output gear includes a tooth point axially stepped back from a tooth point on an adjacent tooth thereof.

* * * * *

UNITED STATES PATENT AND TRADEMARK OFFICE
CERTIFICATE OF CORRECTION

PATENT NO. : 5,983,741
DATED : November 16, 1999
INVENTOR(S) : William K. Warwick, Mario C. DeSantis, Keith L. Snyder It is certified that error appears in the above-identified patent and that said Letters Patent is hereby corrected as shown below:

Column 2, line 39, "an" should be --a--.

Column 4, line 54, delete "to" (second occurrence).

Column 6, line 27, delete "into". (second occurrence).

Column 6, line 14, "122a" should be --122b--.

Column 7, line 9, claim 1, "first" should be --second--.

Column 7, line 11, claim 1, "first" should be --second--.

Column 7, line 39, claim 7, "speed" should be --input--.

Column 7, line 47, claim 7, "idler" should be --reverse output--.

Column 7, line 58, claim 8, "first" should be --second--.

Signed and Sealed this

First Day of May, 2001

*Attest:*

NICHOLAS P. GODICI

*Attesting Officer*   Acting Director of the United States Patent and Trademark Office